(12) United States Patent
Knauder

(10) Patent No.: US 6,892,617 B1
(45) Date of Patent: May 17, 2005

(54) FEEDING ARM

(75) Inventor: Josef Knauder, Villach (AT)

(73) Assignee: HOBAS Engineering GmbH (AT)

( * ) Notice: Subject to any disclaimer, the term of this patent is extended or adjusted under 35 U.S.C. 154(b) by 0 days.

(21) Appl. No.: 09/700,693

(22) PCT Filed: Jan. 28, 2000

(86) PCT No.: PCT/EP00/00649
§ 371 (c)(1),
(2), (4) Date: Feb. 15, 2001

(87) PCT Pub. No.: WO00/56525
PCT Pub. Date: Sep. 28, 2000

(30) Foreign Application Priority Data

Mar. 19, 1999 (DE) .......................... 199 12 297

(51) Int. Cl.[7] .............................. B26D 1/22; B29C 41/04
(52) U.S. Cl. ..................... 83/436.3; 83/348; 83/436.45; 83/436.6; 83/913; 83/950
(58) Field of Search ........................ 83/347, 348, 346, 83/913, 950, 436.3, 436.45, 436.6

(56) References Cited

U.S. PATENT DOCUMENTS

| 2,010,078 | A | * | 8/1935 | Hale | .................. 83/913 X |
|---|---|---|---|---|---|
| 2,974,554 | A | * | 3/1961 | Schurmann et al. | ...... 83/347 X |
| 3,045,520 | A | * | 7/1962 | Haruyama | ............. 83/436.3 X |
| 3,111,875 | A | * | 11/1963 | Takehara | .................. 83/346 X |
| 3,763,561 | A | * | 10/1973 | Scharfenberger | .......... 83/347 X |
| 3,869,268 | A | * | 3/1975 | Briar et al. | ................ 83/347 X |
| 3,942,401 | A | * | 3/1976 | Roncato | ................... 83/346 X |
| 3,992,967 | A | * | 11/1976 | Fram | ........................ 83/346 X |
| 4,063,479 | A | * | 12/1977 | Roncato | ................... 83/346 X |
| 4,191,079 | A | * | 3/1980 | Symborski | ................ 83/347 X |
| 4,637,286 | A | * | 1/1987 | Boggs | ....................... 83/347 X |
| 5,253,561 | A | * | 10/1993 | Wynn | ....................... 83/346 X |
| 5,454,286 | A | * | 10/1995 | Takaha | ....................... 83/346 |
| 6,076,442 | A | * | 6/2000 | Arterburn et al. | ........ 83/913 X |
| 6,202,525 | B1 | * | 3/2001 | Hendrickson et al. | .... 83/913 X |

FOREIGN PATENT DOCUMENTS

| DE | 0790114 | 8/1997 |
|---|---|---|
| JP | 57 077531 | 5/1982 |
| JP | 59 076224 | 5/1984 |

* cited by examiner

Primary Examiner—Charles Goodman
(74) Attorney, Agent, or Firm—Kusner & Jaffe

(57) ABSTRACT

The invention relates to a charging arm for conveying, treating and discharging different starting materials in order to produce glass fiber armored plastic pipes.

10 Claims, 2 Drawing Sheets

FEEDING ARM

FIELD OF INVENTION

The invention relates to a feeding arm for conveying, preparing and supplying various starting materials for the production of glass-fiber-reinforced plastic pipes.

BACKGROUND OF THE INVENTION

A feeding arm usually comprises a kind of a filling station at one end to which the various starting materials such as glass fibers, sand, resin, catalyst as well as further optional filler materials and additives are supplied. The conveyance of said starting materials is performed through pipes of different diameter along the feeding arm to the so-called head of the feeding arm at the other end. There, the continuously conveyed glass fibers (strands of glass fibers, glass fiber yarns) are cut to the respectively desired length with the help of a cutting device, are mixed with the further starting materials and discharged radially (spun off) from where they are centrifuged in a drum-like rotating matrix (mould). The feeding arm moves in an alternating reciprocating manner back and forth in the axial direction of the mould. In this way a pipe with the desired diameter and the desired wall thickness is gradually built up.

Thereafter, the feeding arm is pulled out of the mould and introduced into a new free mould, whereas the previously produced pipe such as a sewage pipe for example is cured in the mould and is thereafter removed from the mould.

Such a method is known as the HOBAS method for the production of centrifuged glass fiber reinforced plastic pipes.

The cutting device consists of three rollers which are arranged in a mutually axially parallel way. A first and second roller are used as conveying rollers. They are both provided with a smooth surface, rotate in opposite directions and their surfaces roll off on one another, whereby they simultaneously convey the strands of glass fibers which are guided along the roller surfaces.

A third roller, a so-called cutter block, is arranged behind the first and second roller. This roller is provided on its surface with a plurality of knives which are arranged spaced from one another in the axial direction of the roller. The cutter block rotates against the direction of the second roller, with the knives rolling off on the surface of the second roller (meaning that they touch the same).

The strands of glass fibers which are conveyed with the help of the first and second roller (conveying rollers) are thereafter guided between the second and third roller and cut to a corresponding length according to the distance between the knives on the cutter block.

The cut glass fibers are thereafter mixed with the further starting materials and discharged from the feeding arm in the manner as described above.

A feeding arm with the aforementioned cutting device has principally proven its worth in practical operations. It has been noticed, however, that the cutter block in particular can heat up to temperatures between 50 and 60° C., particularly during continuous operation. This heating leads to an increased wear of the knives. It was further observed that chemicals will deposit on the surface of the conveying rollers with which the glass fibers are coated for the purpose of better adherence in the matrix material of the pipe to be produced. This, in turn, can lead to increased wear by friction of the surfaces of the conveying rollers and consequently to an adverse grip of the fibers.

The invention is based on the object of providing a feeding arm of the kind mentioned above in which the described increase of temperature in the zone of the cutting device is at least reduced in order to avoid the aforementioned disadvantages.

One possibility would be the exchange of the predominantly metallic rollers against such made of plastic or hardwood which comprise a particularly lower heat conductivity. These rollers, however, comprise a considerably reduced mechanical strength and would therefore have to be exchanged more frequently. This would lead to undesirable standstill periods of the production plant.

Another possibility would be the cooling of the rollers by means of cooling air. This also entails a number of disadvantages: Cooling air would have to be supplied separately. In this respect, an additional cooling air conduit along the feeding arm would be necessary. As a result of the large number of conveying lines in the feeding arm for the numerous starting materials the provision of a further conveying line would lead to a space problem. Moreover, the cooling air would have to be distributed over the entire area of the roller surfaces. This would also lead to considerable space problems. Finally, the cooling air would have to be blown with a respective flow speed onto the rollers, thus making the guidance of the strands of glass fibers and the cut glass fibers uncontrollable in the zone of the cutting device.

BRIEF SUMMARY OF THE INVENTION

In the course of extensive preliminary tests various constructional modifications were tested. As a result, a completely different approach proved to be advantageous:

The desired object can be achieved in such a way that the aforementioned first roller (i.e. the roller that is not in contact with the cutting roller) is provided with a profiled surface.

By profiling the surface of the first roller a smaller surface contact is obtained between the first and second conveying roller. In this way, air can be additionally entrained during the conveyance of the strands of glass fibers between the rollers, which air has a cooling effect, particularly also in the direction towards the downstream third roller. This effect is supported by the rotational movement of the first roller which thus acts in the manner of a fan.

Accordingly, the invention relates in its most general embodiment to a feeding arm for the conveyance, preparation and supply of various starting materials for the production of glass fiber reinforced plastic pipes with the following features:

A cutting device arranged on the output end for cutting glass fiber yarns to a predetermined length;

the cutting device is provided with at least three rollers which are arranged in an axially parallel manner;

the first roller is arranged with a profiled surface and is arranged such that it rolls off with its surface on a second roller which rotates in a direction opposite to that of the first roller;

a third roller is provided on its surface with a plurality of knives which extend spaced from one another in the axial direction of the roller and are arranged such that they roll off with their surface on the second roller which revolves in a direction opposite to that of the third roller.

In accordance with an embodiment, the second roller of the cutting device is to be provided with a reversibly deformable surface. In this way the "pressing pressure" of the first roller against the second roller can be increased with the advantage of a purposeful leadthrough of the strands of glass fibers. "Reversibly deformable surface" shall mean that the profiled surface of the first roller can press slightly into the surface of the second roller and that the surface will thereafter deform back again once the respective profiled element of the roller no longer has any contact with the surface of the second roller.

The second roller can consist superficially or in full of a respective material on the basis of plastic or caoutchouc for example.

The profiling of the first roller comprises in accordance with a further embodiment some ribs which extend in the axial direction of the roller. In this way the roller is provided with a "wave profile" on its surface. Particularly this embodiment shows a strong expression of the aforementioned "fan effect" which can be achieved with the roller.

It is sufficient to arrange the ribs with a relatively low height such as 1 to 5 mm for example. The distance of the ribs from one another can be as well within this range.

The first roller can have a smaller diameter than the second and third roller. This leads to a higher rotational speed as compared with the second roller. The higher rotational speed leads to an intensifying of the aforementioned cooling effect, with the air being conducted in the conveying direction of the strands of glass fibers in the direction towards the third roller.

The described cooling effect further leads to the consequence that the described deposits of additives (coating agents) of the strands of glass fibers are reduced considerably or avoided totally. The reduced surface contact between the first and second roller which is caused by the profiling of the first roller also contributes to this phenomenon.

Although the described cooling also allows considerably reducing the wear of the knives of the third roller, they are naturally still subject to a certain amount of wear.

It is therefore provided for in an embodiment to exchangeably fasten the knives of the third roller in the roller's body.

Finally, the invention provides to resiliently carry the first roller and/or the second roller, thus allowing the pressing pressure against the adjacent roller to be set to a desired amount either permanently and/or according to the respective application.

Further features of the invention are obtained from the features of the subclaims and the other application documents.

BRIEF DESCRIPTION OF THE DRAWINGS

The invention is now explained in closer detail by reference to an embodiment. Schematic illustrations thereof show as follows.

Components with a same or similarly function are shown with the same reference numerals in the figures.

DETAILED DESCRIPTION OF THE INVENTION

Figure 1:
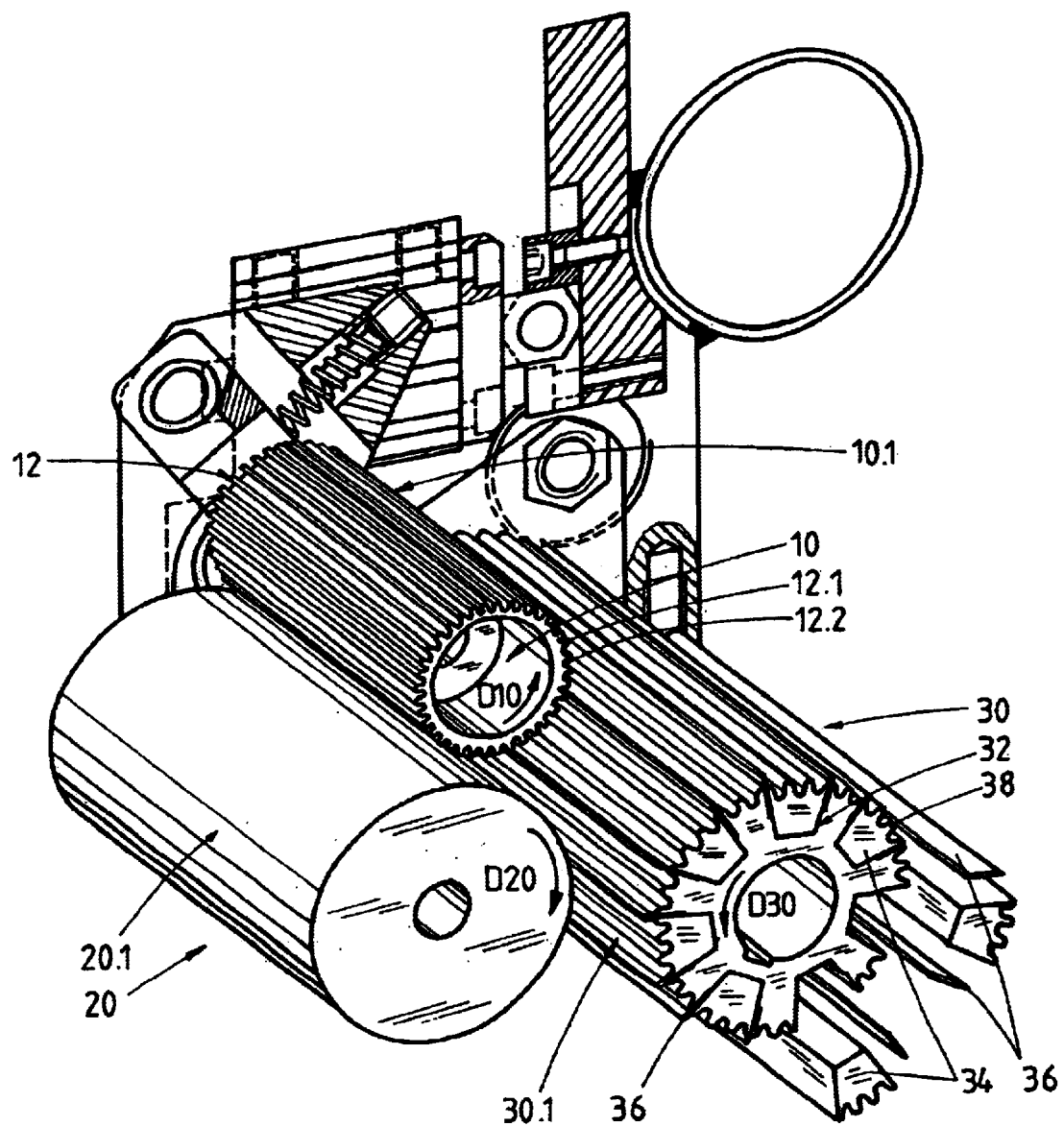
FIG. 1 a perspective view of a cutting device.

The cutting device comprises a first roller 10 which is provided in the zone of its surface 10.1 with an axial ribbing 12. As a result, ribs 12.1 which extend in the axial direction of the roller 10 and valleys 12.2 which extend parallel thereto between the ribs 12.1 are formed. Roller 10 is thus provided with a structural shape in the manner of a fan.

During the rotation of the roller 10 in the direction of arrow D10 air (cooling air) is accordingly conveyed in the direction towards a third roller (the cutting roller 30) which is arranged behind the same.

A second roller 20 is arranged coaxially to roller 10 adjacent to the latter, with the surface 20.1 of said second roller being provided with a coating made of rubber. Roller 10 rolls with its ribbing 12 on the surface 20.1 of roller 20 which rotates accordingly in the direction of arrow D20.

The cutting roller 30 is arranged coaxially to the second roller 20 behind the roller 10 and rotates in the direction of arrow D30. The cutting roller 30 also comprises a profiled surface 30.1, similar to the first roller 10. Trapezoid recesses 32 can be recognized in the surface zone of the cutting roller 30, which recesses extend in the axial direction of the third roller 30. Corresponding roller elements 34 rest in said recesses 32 whose surface extends the ribbing of the adjacent sections of the cutting roller 30. The roller elements 34 rest in a stationary manner in the recesses 32 and simultaneously fix the knives 36 which extend in the axial direction of the cutting roller 30 and are fixed between the corresponding flanks of the roller elements 34 and the recesses 32 and project over the ribs 38 of the third roller 30.

The cutting roller 30 is arranged in such a way that its knives 36 (here: 14 knives) touch the surface 20.1 of the second roller 20 or roll off from the same.

In this way the strands of glass fibers which at first are guided between the rollers 10, 20 are cut on their way between the rollers 20, 30 into corresponding sections according to the distance between the knives 36.

Figure 2:
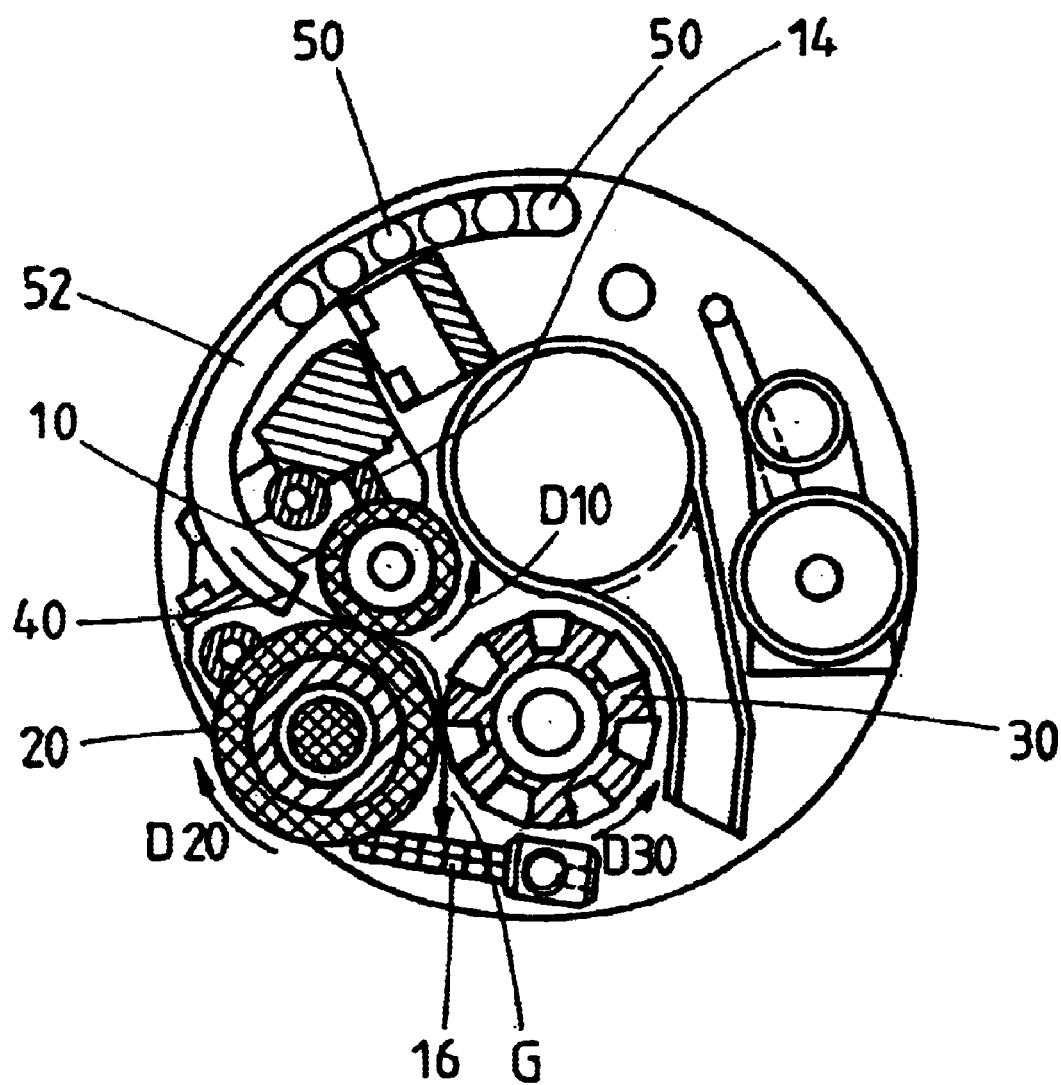
FIG. 2 a cross section through a feeding arm in the zone of the cutting device.

FIG. 2 schematically shows the path of the strands of glass fibers (indicated there with reference numeral 40) with arrow G.

FIG. 2 also shows that the glass fiber strands 40 supplied in the axial direction of the rollers 10, 20, 30 via various pipes 50 are deflected before their path through the cutting device along a curved path 52 of the pipes 50.

FIG. 2 also shows, in a schematic form, a resilient bearing (spring 14) of the first roller 10 or the second roller 20 (cylinder 16).

The profiling of the first roller 10 in particular leads to a dramatically increased supply of cooling air to the cutting device in total as compared with the known cutting devices and in particular to the contact zone of the first roller 10 with the second roller 20 or the second roller 20 with the third roller 30. Respective tests have shown that as a result of the described arrangement it is possible to limit the increase of temperature of the rollers to 3 to 5 degrees.

What is claimed is:

1. A feeding arm for production of glass fiber reinforced plastic pipes, comprising:

a) at least one pipe running along the length of the feeding arm from a filling station at a first end of the feeding arm, where starting materials, including glass fiber yarns, sand, resin and catalyst are supplied, to a head at a second output end of the feeding arm, where the glass fiber yarns are cut and discharged radially together with the sand, resin and catalyst; and b) a cutting device arranged within the second output end of said feeding arm for cutting said glass fiber yarns (40), which thereafter are discharged radially with the sand, resin and catalyst, said cutting device including at least a first roller (10), a second roller (20), and a third roller (30), which are arranged within said feeding arm axially and parallel to one another, wherein said first roller (10) is provided with a respective surface (10.1) profiled by ribs (12.1) extending in an axial direction of the first roller (10) and is arranged such that said first roller rolls off with said respective surface (10.1) on said second roller (20) which revolves in a direction opposite that of the first roller (10); and said third roller (30) having a respective surface (30.1) provided with a plurality of knives (36) extending in a spaced manner in the axial direction of the third roller (30) and arranged such that said third roller rolls off with said respective surface (30.1) on the second roller (20) which revolves in a direction opposite of the third roller (30), so that the glass fiber yarns are cut into sections, according to a distance of the knives.

2. A feeding arm as claimed in claim 1, wherein the second roller (20) of the cutting device is provided with a resilient surface (20.1).

3. A feeding arm as claimed in claim 2, wherein the surface (20.1) of the second roller (20) is made of a material based on plastic or caoutchouc.

4. A feeding arm as claimed in claim 1, wherein the first roller (10) is provided with a smaller diameter than the second and third roller (20, 30).

5. A feeding arm as claimed in claim 1, wherein the knives (36) of the third roller (30) are exchangeably fastened to a body of the roller (30).

6. A feeding arm as claimed in claim 1, wherein the third roller (30) is arranged with axially extending ribs (38) in a zone between the knives (36).

7. A feeding arm as claimed in claim 1, wherein the first roller (10) is guided resiliently.

8. A feeding arm as claimed in claim 1, wherein the second roller (20) is held resiliently.

9. A feeding arm as claimed in claim 1, wherein said feeding arm is movable in an alternating reciprocating manner back and forth in the axial direction of a mould.

10. A feeding arm as claimed in claim 9, wherein said feeding arm is movable into and out of the mold.

* * * * *